(12) United States Patent
Draper

(10) Patent No.: US 8,052,378 B2
(45) Date of Patent: Nov. 8, 2011

(54) FILM-COOLING AUGMENTATION DEVICE AND TURBINE AIRFOIL INCORPORATING THE SAME

(75) Inventor: Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 12/406,277

(22) Filed: Mar. 18, 2009

(65) Prior Publication Data

US 2010/0239412 A1    Sep. 23, 2010

(51) Int. Cl.
*F01D 5/08* (2006.01)
(52) U.S. Cl. ..... 415/115; 415/116; 415/119; 415/121.2; 416/96 A; 416/96 R; 416/193 A
(58) Field of Classification Search ............... 415/1, 115, 415/116, 119, 121, 2, 173.6, 191, 200; 416/1, 416/92, 96 A, 96 R, 97 R, 193 A, 235, 500
See application file for complete search history.

(56) References Cited

U.S. PATENT DOCUMENTS

| | | | |
|---|---|---|---|
| 5,419,039 A * | 5/1995 | Auxier et al. ............ 29/889.721 |
| 5,472,316 A * | 12/1995 | Taslim et al. ............... 416/97 R |
| 5,577,889 A * | 11/1996 | Terazaki et al. ........... 416/97 R |
| 5,660,524 A | 8/1997 | Lee et al. |
| 6,267,552 B1 * | 7/2001 | Weigand .................. 415/115 |
| 6,270,317 B1 | 8/2001 | Manning et al. |
| 6,283,708 B1 * | 9/2001 | Zelesky ..................... 416/97 R |
| 6,402,471 B1 * | 6/2002 | Demers et al. ............. 416/97 R |
| 6,406,260 B1 * | 6/2002 | Trindade et al. ........... 416/96 R |
| 6,506,013 B1 | 1/2003 | Burdgick et al. |
| 6,966,756 B2 | 11/2005 | McGrath et al. |
| 7,008,186 B2 * | 3/2006 | Heeg et al. ................. 416/97 R |
| 7,014,424 B2 * | 3/2006 | Cunha et al. ............... 416/97 R |
| 7,051,532 B2 | 5/2006 | Howell et al. |
| 7,186,085 B2 * | 3/2007 | Lee .............................. 416/97 R |
| 7,232,290 B2 * | 6/2007 | Draper et al. .............. 416/97 R |
| 7,249,934 B2 | 7/2007 | Palmer et al. |
| 7,278,826 B2 * | 10/2007 | Blaskovich et al. ........ 416/97 R |
| 7,296,973 B2 | 11/2007 | Lee et al. |
| 7,300,252 B2 | 11/2007 | Liang |
| 7,413,403 B2 * | 8/2008 | Cunha et al. ................... 416/1 |
| 7,413,405 B2 * | 8/2008 | Busbey et al. ............... 416/96 A |
| 7,513,743 B2 * | 4/2009 | Liang ........................... 416/92 |
| 7,686,580 B2 * | 3/2010 | Cunha et al. ............... 416/97 R |
| 7,704,047 B2 * | 4/2010 | Liang et al. ................. 416/97 R |
| 7,736,124 B2 * | 6/2010 | Bauer et al. ................. 415/119 |
| 7,780,415 B2 * | 8/2010 | Liang ........................... 416/97 R |
| 7,837,438 B2 * | 11/2010 | Campbell .................... 415/191 |
| 7,866,947 B2 * | 1/2011 | Pietraszkiewicz et al. . 416/96 R |
| 7,967,567 B2 * | 6/2011 | Liang ........................... 416/97 R |
| 2005/0232768 A1 * | 10/2005 | Heeg et al. ................. 416/97 R |
| 2006/0039876 A1 * | 2/2006 | Dumousseaux et al. ........ 424/63 |
| 2006/0226290 A1 * | 10/2006 | Campbell .................. 244/123.1 |
| 2009/0068022 A1 * | 3/2009 | Liang ........................... 416/97 R |
| 2010/0239409 A1 * | 9/2010 | Draper ............................. 415/1 |
| 2011/0027102 A1 * | 2/2011 | Nakamata et al. ........... 416/97 R |

* cited by examiner

*Primary Examiner* — Michael Lebentritt
(74) *Attorney, Agent, or Firm* — Cantor Colburn LLP

(57) ABSTRACT

A turbine airfoil is disclosed. The airfoil includes one of a turbine shroud, liner, vane or blade, including an airfoil sidewall having a film-cooling hole that extends between an airfoil cooling circuit and an airfoil surface. The airfoil also includes an insert disposed in the film-cooling channel having a body. The body has a proximal end configured for disposition proximate the airfoil surface and a distal end. The body is also configured to define a passageway that extends between the distal end and proximal end upon disposition in the film-cooling hole.

20 Claims, 9 Drawing Sheets

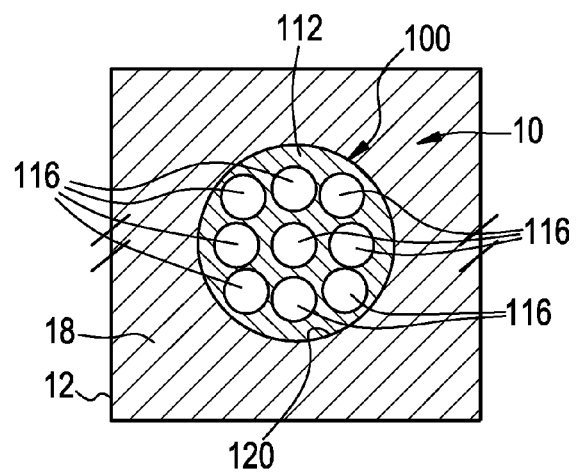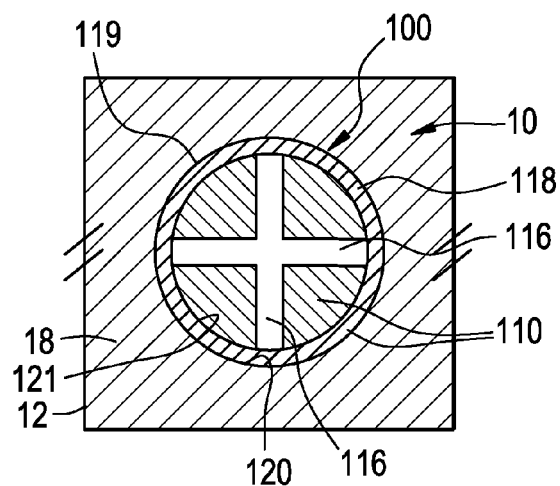
FIG. 11  FIG. 12
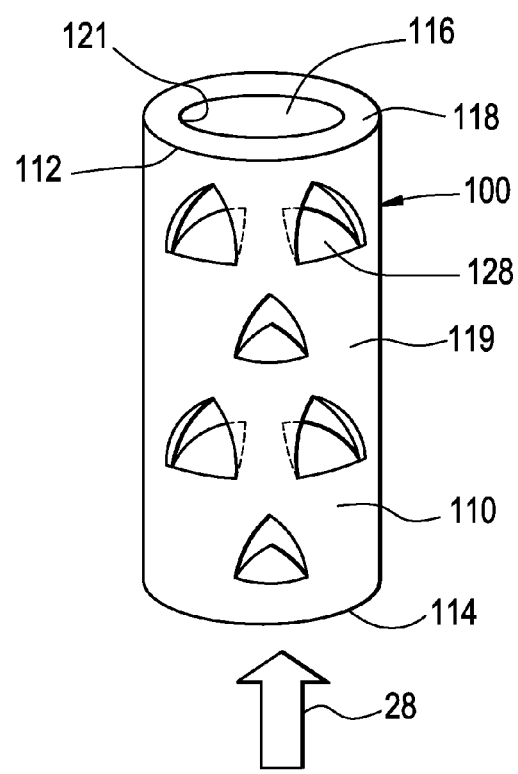
FIG. 13

FILM-COOLING AUGMENTATION DEVICE AND TURBINE AIRFOIL INCORPORATING THE SAME

BACKGROUND OF THE INVENTION

The subject matter disclosed herein relates generally to gas turbine engines, and, more particularly, to a film-cooling augmentation device and turbine airfoil that incorporates the same.

Gas turbine engines generally include a compressor that pressurizes air that is then mixed with fuel in a combustor for generating hot combustion gases. Energy from these combustion gases is extracted in multiple turbine stages for powering the compressor and producing useful work, typically by powering a fan in an aircraft turbofan application, or by powering an output shaft for marine, industrial and other applications.

The combustion gases flow along and transfer heat to various components of the turbine engine. These heated components are cooled in part by a cooling system that uses a portion of the pressurized air generated by the compressor in a cooling circuit that extends to the surface of these components to provide film-cooling of their surfaces that are exposed to the hot combustion gases, or that are heated thereby. The film cooled turbine components include the combustor, nozzles, rotor disks, blades, vanes, shrouds, liners and other components.

The hot combustion gases are initially discharged from the combustor into a stationary high pressure turbine inlet comprising the first stage turbine nozzle which includes an array of circumferentially-spaced, radially-extending stator nozzle vanes that include vane airfoils which extend between inner and outer bands. The vane airfoils are partially hollow and form a part of the cooling circuit and include various rows and other patterns of film-cooling holes extending through their sidewalls for discharging film-cooling air to form a boundary layer over their outer surfaces, particularly at the leading and trailing edges of the airfoils. The other stages of the turbine also include similar nozzles and arrays of vanes.

The first stage of the turbine also includes a turbine rotor including an array of circumferentially-spaced, radially-extending turbine rotor blades that are attached to an outer portion of a supporting rotor disk. Each blade includes a partially hollow dovetail portion that is attached to a partially hollow turbine airfoil where their hollow portions form a part of the cooling circuit and include various rows and other patterns of film-cooling holes extending through the sidewalls thereof for film-cooling the outer surfaces thereof, particularly at the leading and trailing edges of the airfoil. The other stages of the turbine also include similar rotors disks and arrays of vanes.

Film-cooling holes are also found in other components of the typical gas turbine engine and are arranged in various patterns for promoting a film-cooling blanket of air over the surfaces that are exposed either directly or indirectly to the hot combustion gases. The film-cooling holes are frequently arranged in linear rows, with the rows being spaced laterally apart for distributing the film-cooling air as required for accommodating the local heat loads from the combustion gases and forming the blanket of cooling air.

A typical film-cooling hole is tubular or cylindrical and manufactured by laser drilling for example. Another form of film-cooling hole is the diffusion hole which has various configurations in the art. In the diffusion hole the outlet portion thereof diverges or increases in flow area in the downstream aft direction from the upstream inlet for reducing the discharge velocity therefrom. An exemplary diffusion hole has a trapezoidal outlet with side edges which diverge at a suitably small diffusion angle, and an inner land which blends with the component outboard surface at a shallower inclination angle than the nominal inclination angle through the inlet portion of the hole. In this way, the typical diffusion hole is effective for laterally spreading the discharged cooling air jet and locally enhancing film-cooling performance.

The configuration, quantity, and pattern of the film-cooling holes, including their cross-sectional shape, length and angle with the surface to be cooled are specifically designed for the expected heat load, which varies from component to component and over the outboard surface of an individual component. Generally, film-cooling hole design, including size, shape, pattern, location and other aspects, has as an objective reduction of the amount of film-cooling air bled from the compressor, since use of such air for film-cooling prevents its use in the combustion process and thus reduces efficiency of the engine.

The performance of film-cooling holes is affected by many factors, including their geometry including their surface area, and the local conditions in the specific components including the differential pressure or pressure ratio between the outboard and inboard sides of the film-cooling holes, and the velocity and pressure distribution of the combustion gases over the outboard surfaces.

While film-cooling holes, including diffusion holes, are useful to provide film-cooling in the manner noted above, the ability to control the pressure differential or pressure ratio between the outboard and inboard sides of the film-cooling holes and the airflow through them, as well as the amount of convective cooling of the airfoil sidewall adjacent to the hole have generally been limited to control of the characteristics of the holes themselves, such as their location, spacing, size, shape, orientation (e.g., orientation of the hole inlet to the cooling circuit and angle with the airfoil surface), number and the like, which are in turn have been limited by the manufacturing methods used to create them and other considerations, such as the overall performance requirements of the airfoil.

Accordingly, it is desired to provide improved methods of cooling gas turbine engine components from the film-cooling holes utilized therein.

BRIEF DESCRIPTION OF THE INVENTION

According to one aspect of the invention, a turbine airfoil is disclosed. The airfoil includes one of a turbine shroud, liner, vane or blade, including an airfoil sidewall having a film-cooling hole that extends between an airfoil cooling circuit and an airfoil surface. The airfoil also includes an insert disposed in the film-cooling channel having a body. The body has a proximal end configured for disposition proximate the airfoil surface and a distal end. The body is also configured to define a passageway that extends between the distal end and proximal end upon disposition in the film-cooling hole.

According to another aspect of the invention, an insert for a film-cooling hole of a turbine airfoil as disclosed. The insert includes a body that is configured for disposition in the film-cooling hole having a proximal end configured for disposition proximate an airfoil surface and a distal end. The body also is configured to define a passageway that extends between the distal end and proximal end upon disposition in the film-cooling hole.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 11 is a cross-sectional view of a sixth exemplary embodiment of a film-cooling insert as described herein;

FIG. 12 is a seventh exemplary embodiment of a film-cooling insert as described herein;

FIG. 13 is a perspective view of an eighth exemplary embodiment of a film-cooling insert as described herein;

Figure 1:
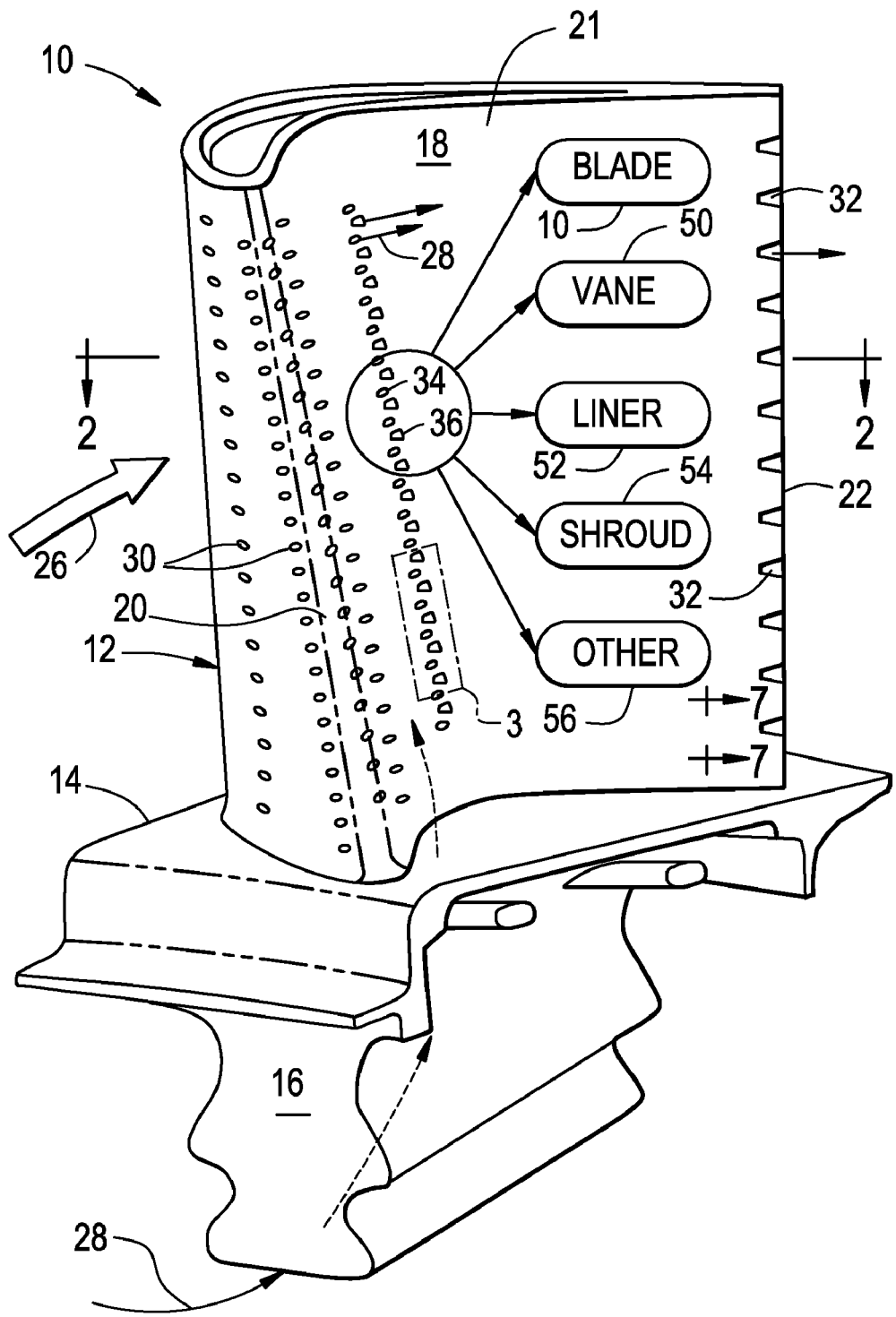
FIG. 1 is a perspective view of an exemplary turbine air foil as described herein.

The detailed description explains embodiments of the invention, together with advantages and features, by way of example with reference to the drawings.

DETAILED DESCRIPTION OF THE INVENTION

Film-cooling holes are widely used in modern gas turbines to cool the turbine airfoils that are exposed to the hot combustion gases during operation of the turbine. The film-cooling holes provide cooling of the airfoil in several ways. Firstly, they provide film-cooling of the airfoil surface. Film-cooling is the cooling of a body or surface by maintaining a thin fluid layer over the affected area of a fluid that has a lower temperature than the operating environment. The fluid film insulates the film-cooled surface from the external operating environment, thereby reducing convective heat transfer from the external operating environment into the airfoil. Further, the film of the cooling fluid also removes heat from the airfoil surface. Secondly, film-cooling also provides convective heat transfer from and cooling of the airfoil sidewall surrounding the film-cooling hole as the cooling air passes flows through it along the length of the hole. Thirdly, the film-cooling hole removes heat by providing an exhaust path for the cooling air that has been heated as it in turn cools the airfoil by passage through the airfoil cooling circuit.

Referring to FIGS. 1-15, several exemplary embodiments of film-cooling inserts 100 for a turbine airfoil are disclosed. Film-cooling inserts 100 are advantageous in that they may be used to provide one or more of an increase in the pressure drop across (i.e., along the length of) the film-cooling holes, an increase in the heat transfer coefficient associated with or attributable to the film-cooling holes, an increase of the surface area of the holes over which heat transfer occurs, an improvement of the film pattern and the film-cooling associated with the film-cooling hole, a reduction of the tendency of the film holes to plug with ash and other particulate constituents found in the hot combustion gas environment to which the airfoils are exposed, or provision of a film-cooling scheme that is self-healing in the event that the cooling passages associated with the insert become plugged. The film-cooling holes may be drilled somewhat larger than normal to accommodate the inserts 100. The inserts 100 create a more tortuous path for air flowing through the film-cooling hole, thereby providing the advantages described above. The inserts 100 may also include a feature at the outlet of the hole to protect the hole from ingesting particulates from the hot gas stream. The insert can also have a feature at the outlet of the hole to direct the film against the surface of the airfoil or otherwise control the shape of the cooling film exiting the film-cooling hole. Either the insert or the material used to attach the insert may have a melting temperature that is lower than that of the airfoil sidewall so that if the film-cooling passage within the insert becomes plugged, the temperature increase that results from the lack of cooling through the passage will cause the insert or the attachment material to melt, such that the pressure of the coolant will cause the insert to be ejected from the film-cooling hole, thereby eliminating the blockage and restoring film-cooling through the film-cooling hole. This self-clearing feature will provide additional film-cooling to alleviate the localized heating described above. The insert may be made of a material with a melting temperature such that it is solid in the film-cooling hole, but liquid after leaving the film hole and being exposed to the hot combustion gases. The insert may also be used to repair parts, or modify the film-cooling characteristics of an existing airfoil design (including an existing film-cooling holes of a defined size, shape, orientation, pattern, etc.) by selective incorporation of film-cooling inserts as described herein.

An exemplary component of a gas turbine engine having an airfoil that employs film-cooling in the form of a turbine rotor blade 10 is illustrated in FIG. 1. The rotor blade includes an airfoil 12 integrally joined to a platform 14 at the root thereof which in turn is joined to a supporting axial-entry dovetail 16 for mounting the blade to the perimeter of turbine rotor disk (not shown) in a conventional manner.

Figure 2:
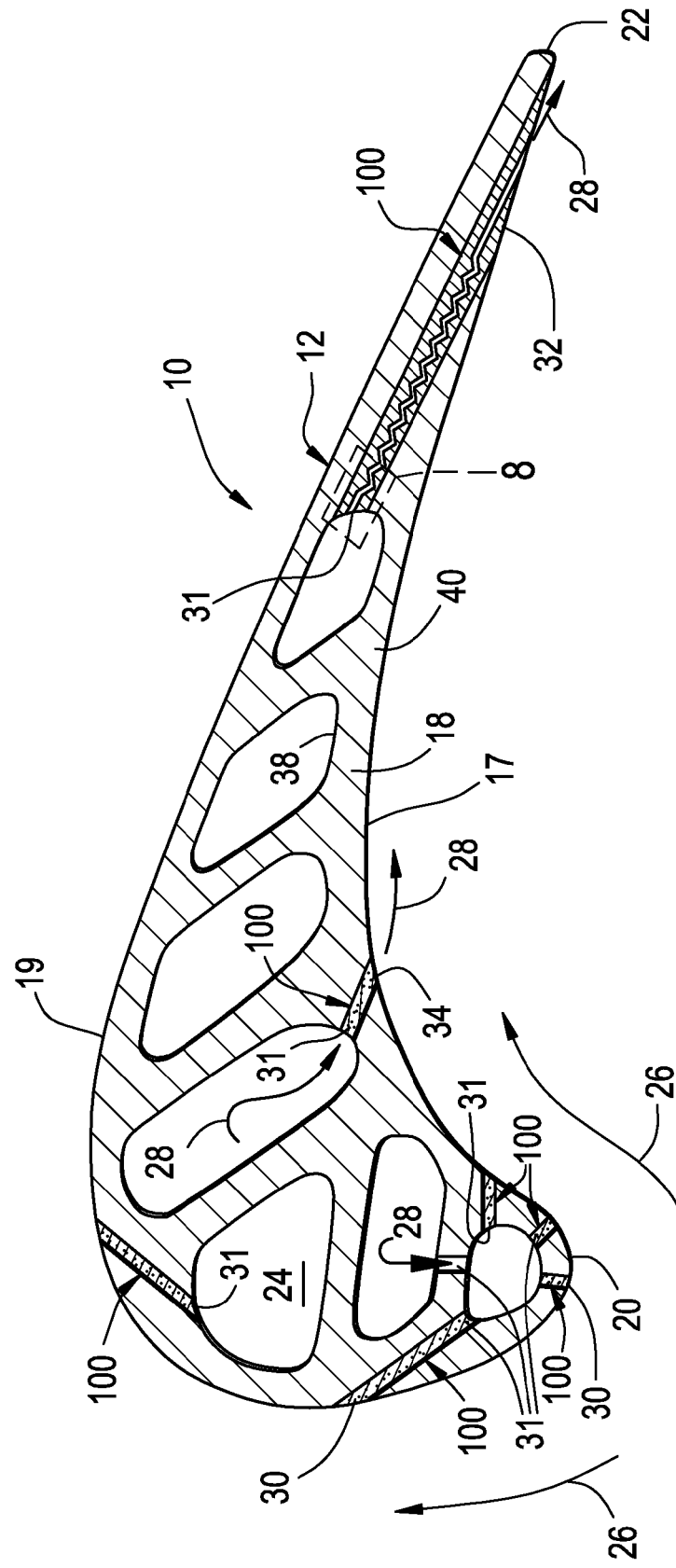
FIG. 2 is a cross-sectional view of the turbine air foil of FIG. 1 taken along section 2-2.

As additionally shown in FIG. 2, the airfoil is hollow and is bounded by a thin sidewall 18 which defines a generally concave pressure side 17 of the airfoil and an opposite, generally convex suction side 19 of the airfoil 12 which extend chordally in the axial downstream direction between a leading edge 20 and an opposite trailing edge 22.

The airfoil includes an internal cooling circuit 24 which may have any conventional configuration and typically includes radially extending channels separated by radial partitions bridging the two sides of the airfoil in one or more dedicated circuits, typically including multi-pass serpentine circuits as conventionally known.

During operation, combustion gases 26 are generated in a combustor (not shown) and flow downstream over the outer surface of the airfoil 12. Pressurized cooling air 28 is bled from a compressor (not shown) and suitably channeled through inlet apertures extending radially through the blade dovetail 16 to feed the internal cooling circuit 24.

The internal cooling circuit for the blade illustrated in FIG. 1 may be configured as desired for cooling the different portions of the airfoil between the leading and trailing edges, and typically includes various radial rows of conventional film-cooling holes 30 extending through the pressure and suction sides thereof for discharging the cooling air 28 from the internal cooling circuit 24. The thin trailing edge 22 of the airfoil is also typically cooled by a row of pressure-side trailing edge cooling holes 32 in any conventional configuration.

In the exemplary embodiment illustrated in FIGS. 1 and 2, the film-cooling holes 30 are arranged in various rows around the leading edge region of the airfoil in conventionally known showerhead and gill hole configurations. In this way, the specifically configured film-cooling holes provide local cooling of the different portions of the leading edge on the pressure and suction sides thereof to accommodate the different thermal loads from the combustion gases which flow over the pressure and suction sides of the airfoil with different pressure and velocity distributions.

The exemplary film-cooling holes 30 are typically generally cylindrical or tubular holes inclined through the airfoil sidewall at various inclination angles relative to the changing profile of the airfoil around the leading edge for effecting film-cooling thereof. The term generally cylindrical includes various flattened cylindrical shapes, as well as various conduits having an elliptical or semi elliptical cross-section. Generally, holes 30 are oriented to discharge the coolant, such as cooling air, aft toward the trailing edge in the same direction as that of the combustion gases flowing over the surface of the airfoil; however, orientation so as to provide countercurrent discharge in the direction of the leading edge is also known and within the scope of this disclosure.

FIGS. 1 and 2 also illustrate film-cooling holes having an alternate form in an exemplary hole pattern at an exemplary location along the pressure side of the airfoil, although these holes may be located in any suitable pattern or location in the airfoil sidewall, or other turbine engine components having airfoil surfaces that require film-cooling. More specifically, the sidewall 18, or simply sidewall, of the airfoil is relatively thin and bounds the internal cooling circuit 24. The sidewall 18 may also include a common row or rows of laterally alternating multiform film-cooling holes 34,36 extending outwardly through the sidewall in flow communication with the internal cooling circuit 24 for receiving the pressurized cooling air 28 first used for inside cooling the airfoil. Generally, holes 34, 36 are also oriented to discharge the coolant, such as cooling air, aft toward the trailing edge in the same direction as that of the combustion gases flowing over the surface of the airfoil; however, orientation so as to provide countercurrent discharge in the direction of the leading edge is also possible and within the scope of this disclosure.

The film-cooling first holes 34 are arranged colinearly along the radial span of the airfoil in a row generally normal to the downstream direction of the combustion gases. And, the film-cooling second holes 36 are also arranged colinearly along the span of the airfoil in a common row with the first holes 34, and alternate laterally with respective ones thereof.

Figure 3:
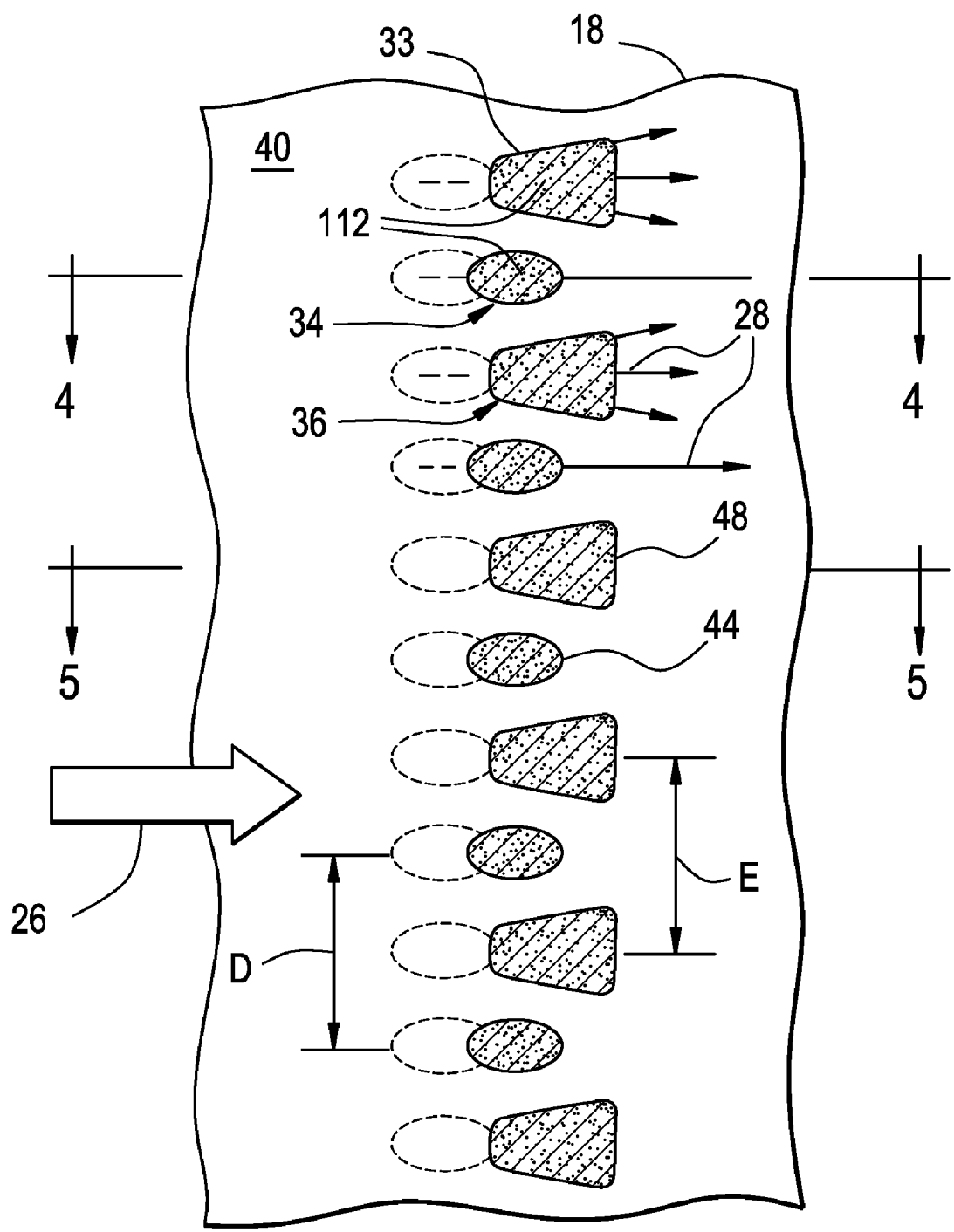
FIG. 3 is a top view of region 3 of FIG. 1.

FIG. 3 illustrates in more detail the common row or radial column of multiform holes 34, 36 extending through the airfoil. The multiform holes 34, 36 are specifically configured differently from each other for complementing the cooling performance thereof in the single or common longitudinal row extending along the airfoil span. The first holes 34 are generally tubular or cylindrical and extend straight through the sidewall 18. The second holes 36 have a different form than the first holes and in one embodiment are in the form of diverging diffusion film-cooling holes, which may have any conventional configuration.

Figure 4:
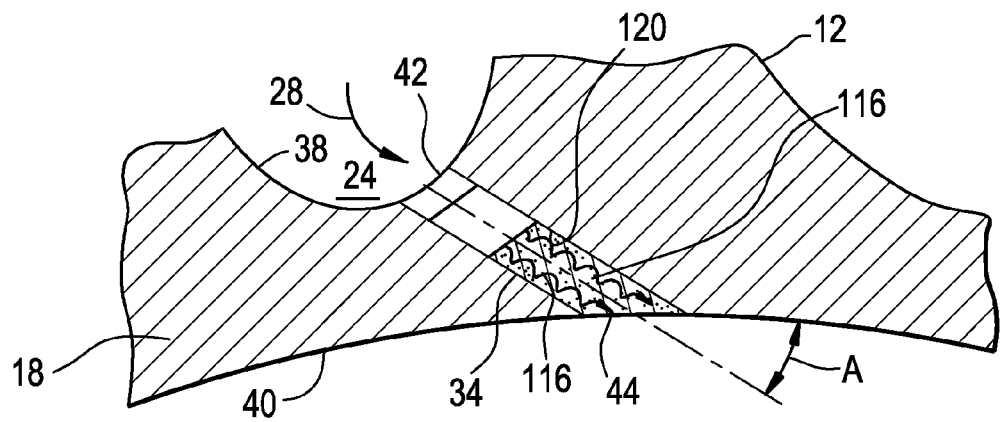
FIG. 4 is a cross-sectional view taken along section 4-4 of FIG. 3.
Figure 5:
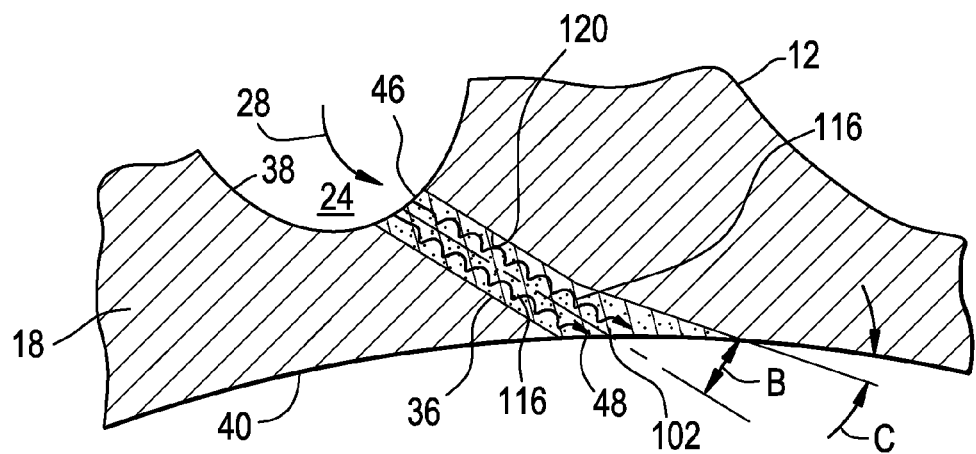
FIG. 5 is a cross-sectional view taken along section 5-5 of FIG. 3.

FIGS. 4 and 5 illustrate in sectional view the different forms of the first and second holes 34, 36 which extend through the common sidewall 18 between the inside or inboard surface 38 thereof and the external or outboard surface 40 thereof. The tubular first hole 34 illustrated in FIG. 4 is in one embodiment inclined through the sidewall 18 at a shallow inclination angle A of about 30 degrees for example. The diffusing second hole 36 is different in form than the cylindrical first hole 34, and is also inclined through the sidewall 18 at a corresponding inclination angle B.

Each of the first holes 34 illustrated in FIG. 4 includes a corresponding first inlet 42 in the form of an aperture in the inboard surface 38 of the sidewall, and a longitudinally opposite first outlet 44 in the form of an aperture in the outboard surface 40 of the airfoil.

Each of the second holes 36 illustrated in FIG. 5 includes a corresponding second inlet 46 in the form of an aperture in the inboard surface 38, and a larger second outlet 48 in the form of an aperture in the outboard surface 40.

The first and second holes 34, 36 illustrated in FIGS. 3 5 may each have any conventional configuration, and may further provide enhanced performance in the commingled row thereof. For example, the cylindrical first holes 34 are inclined through the sidewall 18 and create oval or elliptical first inlets 42 and outlets 44 on the opposite inboard and outboard surfaces due to the inclination angle thereof.

The second holes 36 may have cylindrical second inlets 46 extending in forward part through the sidewall, and the holes 36 diverge in aft part through the sidewall to a generally trapezoidal second outlet 48 on the outboard surface.

The cylindrical portions of the two sets of holes 34, 36 may be substantially identical in diameter or flow area, with the first and second inlets 42, 46 and the first outlet 44 being substantially identical in form and flow area if desired. Alternately, they may differ in these aspects, in any combination.

As shown in FIGS. 4 and 5, the first and second holes 34, 36 may be similarly inclined through the sidewall 18 at corresponding longitudinal inclination angles A, B which may, for example, be equal to each other and about 30 degrees. Alternately, they may differ in these aspects, in any combination. In the embodiment shown in FIGS. 4 and 5, the second holes 36 diverge longitudinally aft from their cylindrical inlets at a shallower inclination angle C at or near the corresponding second outlets 48 in the outboard surface 40.

The inclination angle C of the hole outlet may be about 15 degrees, for example, which permits diffusion of the cooling fluid 28, such as cooling air, in the aft direction and smooth blending thereof with the exposed outboard surface 40 downstream therefrom. As shown in FIG. 3, the exemplary trapezoidal outlet 48 is symmetrical and has diverging sides, each having a suitably small diffusion angle of about 7.5 degrees for example which cooperates with the shallow inclination angle C in a conventional manner.

In both forms of film-cooling holes 34, 36 illustrated in FIGS. 4 and 5, the tubular inlet portions thereof meter the discharge of the pressurized cooling air 28 from the internal cooling circuit of the airfoil. The diverging diffusion outlets 48 of the second holes 36 reduce the discharge velocity therefrom and laterally spread the film-cooling air in the span direction as illustrated schematically in FIG. 3.

In this way, a relatively high velocity jet of cooling air may be discharged from the cylindrical first holes 34 in the same flow direction as the combustion gases, and between the corresponding relatively low velocity jets of film-cooling air discharged from the adjacent second holes 36.

The different forms of the two film-cooling holes, the different performance thereof, and the different distribution of the cooling air jets discharged therefrom may be used to complement the performance therebetween for affecting a collective film of cooling air discharged downstream from the common lateral row thereof.

As indicated above, film-cooling holes discharge jets of cooling air that have film-cooling effect which extends downstream therefrom with a narrow lateral distribution in the radial span direction. The two forms of film-cooling holes may be packed with a corresponding collective density thereof and corresponding coverage or footprint of the corresponding outlets thereof for enhancing both the downstream or aft effectiveness of the collective film of cooling air as well as the lateral effectiveness of the film-cooling air from hole to hole along the longitudinal extent of the common row thereof.

Furthermore, the different forms of the first and second outlets 44, 48 permit complementary coverage between the two types of holes, and the two types of holes may be conventionally manufactured using less expensive laser drilling for the cylindrical holes 34 and more expensive electric discharge machining (EDM) machining for the shaped diffusion holes 36. Accordingly, instead of using a full row of the diffusion holes 36 alone, and their attendant high cost, the diffusion holes may be alternated with the less expensive laser drilled holes 34 for reducing cost of the airfoil, as well as enhancing performance of the pressurized cooling air discharged from the common row of multiform holes.

As indicated above, the individual film-cooling holes 34 and 36 may have any suitable conventional configuration thereof, the former without diffusion and the latter with diffusion, and arranged in a common row laterally side-by-side for complementing the configuration and performance thereof. For example, FIG. 3 illustrates that the first outlets 44 are colinearly aligned with the second outlets 48 along the radial or longitudinal span of the sidewall, with the upstream ends of the two different outlets being generally aligned with each other. Since the two outlets have different forms, the downstream ends thereof may or may not be similarly aligned.

The embodiments of FIGS. 1-5 are merely illustrative of one embodiment of film-cooling in a turbine blade airfoil. Many other turbine blade airfoil configurations already exist that incorporate film-cooling with a vast array of film-cooling hole patterns, sizes, shapes and orientations, and many new turbine blade airfoil configurations with film-cooling are possible, with a corresponding vast array of potential film-cooling hole patterns, sizes, shapes and orientations.

Due to the similarities of the basic shape of a blade airfoil and a vane airfoil, FIGS. 1-5 also illustrate schematically that film-cooling holes, including multiform holes 34, 36, may also be used in a hollow vane airfoil 50 of a turbine stator nozzle in which opposite pressure and suction sides thereof extend between chordally opposite leading and a trailing edges and between radially outer and inner bands (not shown). Nozzle vanes, particularly first stage nozzle vanes, are also typically partially hollow and provided with internal cooling circuits which discharge the spent cooling air through various rows or other configurations or patterns of film-cooling holes through the sidewalls (pressure or suction) thereof. The film-cooling holes may be conveniently introduced in the nozzle vane at any suitable location around the external surface thereof, analogous to that of rotor blade 10. Similarly, FIG. 1 also illustrates schematically that film-cooling holes, including multiform holes 34, 36, may also be used to provide film-cooling through the sidewall to the airfoil surface of a typical annular inner or outer combustion liner 52, as desired, in any region of the liner airfoil surface where film-cooling is desired. As also indicated above and illustrated schematically in FIG. 1, turbine shrouds 54 surround the radially outer tips of the turbine blade and typically also include film-cooling through the sidewall to the shroud airfoil surface. Accordingly, the multiform holes 34, 36 may also be introduced in the turbine shrouds 54 as desired in lieu of conventional patterns of film-cooling holes. As such, the film-cooling improvements described herein are believed to be applicable to these and any other gas turbine airfoil surfaces 56, including combustors, nozzles and disks, that are exposed to hot combustion gases such that film-cooling is desirable, including, without limitation, application to airfoil surfaces within the compressor and other airfoil surfaces associated with the turbine.

Referring to FIGS. 1-5, and particularly to FIG. 2, turbine airfoil 12 includes a plurality of typical cylindrical film-cooling holes 30 in the leading edge and in suction and pressure sidewalls, as well as a plurality of trailing edge cooling holes 32, and a plurality of multiform cooling holes 34, 36, as described herein. These film-cooling holes have a corresponding plurality of film-cooling hole inserts 100 disposed in the film-cooling holes. Inserts 100 include a body 110 that is configured for disposition in the film-cooling hole. Insert body 110 has a proximal end 112 configured for disposition proximate the airfoil surface 21 and an opposed distal end 114. Insert 100 may be located at any location within the film-cooling hole in which it is disposed. By describing insert 100 as having its proximal end 112 proximate the airfoil surface 21 and outlet 33, it is merely meant that this end is located most closely to the airfoil surface 21. Similarly, by describing insert 100 as having its distal end 114 proximate the cooling circuit within airfoil 12 or inlet 31, it is merely meant that this end is located most closely to the cooling circuit 24 and inlet 31. The use of proximate should not be interpreted as requiring that the proximal end 112 of insert 100 be located at or immediately adjacent to the airfoil surface 21 or outlet 33, or that distal end 114 be located at or immediately adjacent to the cooling circuit 24 or inlet 31. Rather, insert 100 may be located with distal end 114 anywhere within the film-cooling hole (FIG. 4), including at locations where distal end 114 of one or more inserts 100 is located at or adjacent to the inlet 31 of the film-cooling hole (FIG. 5). Likewise, insert 100 may be located with proximal end 112 anywhere within the film-cooling hole, including at locations where proximal end 112 of one or more inserts 100 is located with proximal end 112 at or adjacent to the outlet 33 of the film-cooling hole (FIGS. 3-5). Furthermore, one or more inserts 100 may extend and be located at or adjacent to both inlets 31 and outlets 33, as illustrated in FIG. 5. Even further, one or more inserts 100 may project beyond either inlet 31 or outlet 33, such that some or all of them project inwardly into the internal cooling circuit 24 of the airfoil 12, or outwardly of the airfoil surface 21, respectively.

Inserts 100 also include one or more passageways 116 configured for receipt of the cooling fluid 28, such as cooling air, that replaces the passageway that would otherwise exist by virtue of the existence of the film-cooling hole. It is by alteration of this passage to create passageway (or passageways) 116 that the advantages described above with regard to the use of insert 100 to alter the characteristic airflow within and cooling characteristics of the film-cooling hole may be achieved. Passageway (or passageways) 116 extend between the proximal end 112 and distal end 114 of insert 100 in a continuous fashion such that it provides fluid coupling and a fluid flow passageway for cooling fluid 28 to flow from the inlet 31 to the outlet 33 of the film-cooling hole.

The body 110 may be used to divide the volume of the film-cooling hole and define a passageway 116 or passageways 116, or alternately, the body 110 may itself include one or more passageways 116 that may be inserted into the film-cooling hole.

As noted, passageway 116 may include a single passageway, or a plurality of passageways 116 through body 110. In the exemplary embodiment of FIGS. 1-5, both a single passageway 116 and a plurality of passageways 116 are illustrated. Referring to FIGS. 2-5, some of the inserts 100 include a body 110 of a sintered powder compact 102 having a porous structure comprising a network of interconnected particles and a corresponding complementary network of interconnected, inter-particle, interstitial spaces, analogous to various types of sintered powder compact filter media, as shown in FIGS. 2-5 schematically by stippling. The interconnected, interstitial spaces provide the plurality of passageways 116, as they provide multiple fluid flow paths through the body, and a tortuous path for the cooling fluid, thereby promoting enhance heat transfer thereto. The sintered powder compact may be any suitable sintered powder compact. In particular, sintered powder compact may include a sintered metal powder compact, wherein the metal compact has a continuous network of interconnected, interstitial spaces between sintered metal particles or agglomerated groups of particles. For a sintered metal compact, any suitable metal powder or powders may be used. Suitable metals include Cu, Al, Ag or Ni or various Cu-based alloys, Al-based alloys, Ag-based alloys or Ni-based alloys, and the like, in any combination. This network provides a plurality of passageways 116 through insert 100 from the proximal end 112 to the distal end 114. This network of passageways 116 may be used to conduct the cooling air through insert 100. Due to the enhanced surface area of such a structure over that of the film-cooling hole into which it is disposed, the heat transfer coefficient will also be greater than that of a film-cooling hole of the same diameter. In addition to an enhanced heat transfer coefficient, insert 100 also increases the pressure drop across the film-cooling hole from the inlet 31 to the outlet 33. Inserts 100, including sintered powder compacts, also provide more surface area for heat transfer, which also contributes to the increased heat transfer coefficient associated with the film-cooling hole. The sintered powder compact may also be selected to have a melting point that is lower than the melting point of the airfoil, such as airfoil 12. Therefore, should plugging of some or all of the passageways occur, leading to a localized overheating condition within airfoil 12 at locations proximate the obstructed film-cooling hole, the sintered powder compact will at least partially melt, thereby allowing the insert to be ejected by the air pressure within the cooling circuit and clearing the film-cooling hole in which it is disposed, thus restoring cooling within the film-cooling hole in airfoil 12 at that location. Sintered powder compact inserts may be formed in place within the airfoil 12, such as by insertion of green powder performs (not shown) into film-cooling holes and heating the airfoil 12 to sinter the preforms producing sintered powder compact inserts 100. In this case, the powder of the preforms will have a sintering temperature that is compatible with the airfoil 12, such that sintering does not degrade the properties of airfoil 12. Alternately, sintered powder compact may be sintered separately, and then inserted into the film-cooling hole to the desired depth and orientation followed by attachment to the wall 120 of the film-cooling hole, such as by brazing or the other attachment methods described herein.

Figure 6:
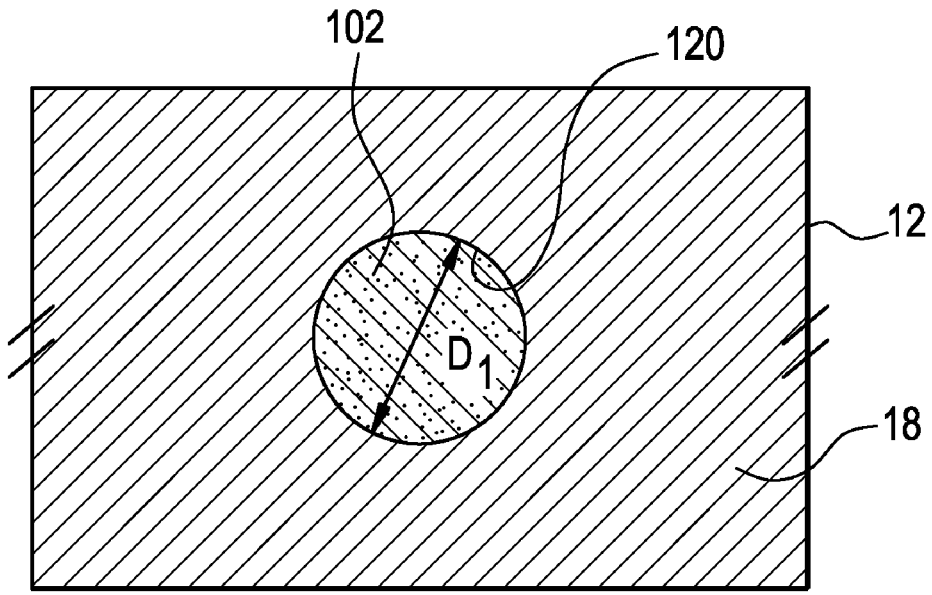
FIG. 6 is a cross-sectional view of an exemplary embodiment of a film-cooling insert as described herein.
Figure 7:
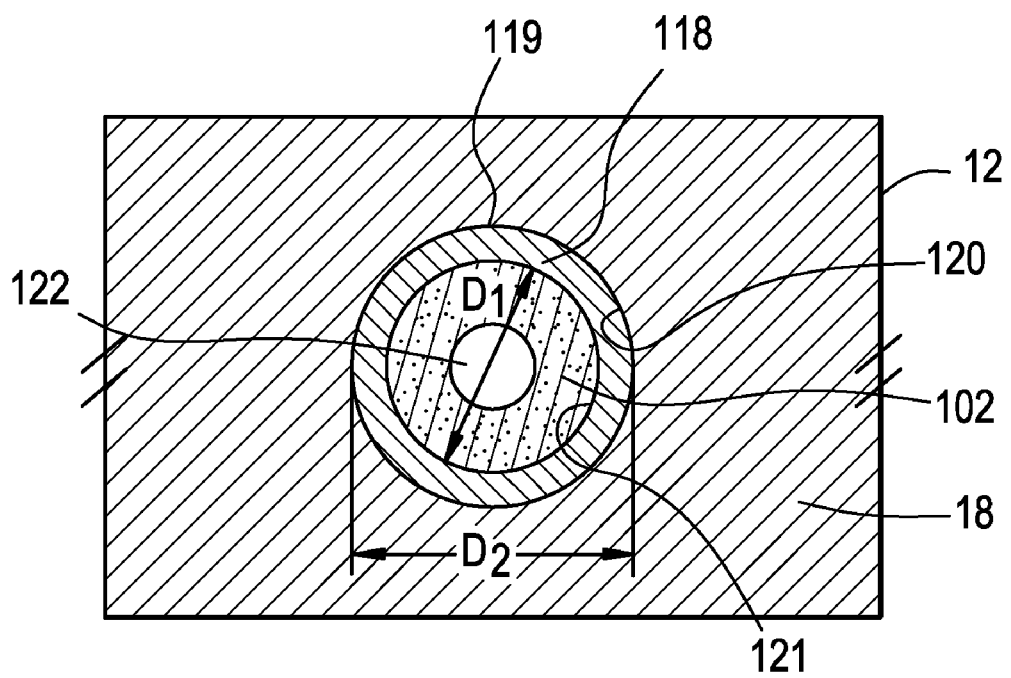
FIG. 7 is a cross-sectional view of a second exemplary embodiment of a film-cooling insert as described herein.

Referring to FIGS. 3-5, body 110 may be inserted into holes of any shape, including cylindrical holes and multi-form holes 34, 36 having various non-cylindrical shapes, or including various tapers or other features at either the inlet 31 or outlet 33 of the holes. In FIG. 4, a sintered powder compact is shown within a film-cooling hole in a cross-sectional view taken orthogonally to the longitudinal axis of the film-cooling hole. As may be seen therein, sintered powder compact may be configured to completely fill the film-cooling hole, such that the only passageway through insert 100 and body 110 is through the plurality of passageways 116 that include the interconnected, interstitial spaces between the sintered powder particles. In this arrangement, film-cooling hole may have a diameter ($D_1$) (FIG. 6). This diameter may be the existing design diameter of the film-cooling hole in the case of existing airfoil designs, or in the case of new airfoil designs incorporating the inserts disclosed herein, the diameter may be designed with the particular airflow characteristics of the sintered powder and insert 100 being used. Thus, the diameter ($D_1$) may be selected in view of the airflow, and particularly the pressure drop, heat transfer and other characteristics, associated with powder metal compact insert 100. This principle may also be utilized with respect to all of the types of inserts 100 disclosed herein. Referring to FIG. 7, for a particular desired diameter ($D_1$), the film-cooling hole diameter may also be adjusted in embodiments that also include a casing 118, the film-cooling hole may be made slightly oversized to a diameter ($D_2$) in order to accommodate the outer diameter of casing 118, while the inner diameter of casing 118 may be sized to achieve the desired diameter ($D_1$) of the passageway 116. Casing 118 may be made from any suitable material, including various pure metals and metal alloys. Suitable pure metals and metal alloys include Cu and Cu-based alloys, Al and Al-based alloys, Ni and Ni-based alloys Ag and Ag-based alloys and the like, and combinations thereof. Sintered powder compact may also include, in addition to the plurality of passageways 116 described above, an additional passageway 116 comprising a through-hole or other through passageway other than the plurality of passageways formed within the sintered powder compact as described above. In the case of a through-hole passageway 122, the diameter of the passageway may be sized to achieve the design objectives for the flow of cooling air through the film-cooling hole in which it is used, such as to achieve a particular pressure drop across the film-cooling hole, or a particular film-cooling pattern at the outlet 33 of the insert 100, or similar design objectives related to the film-cooling hole, such as the heat transfer coefficient (including contribution of insert 100) or film-cooling pattern produced through the film-cooling hole or the like. Casing 118 has an outer surface 119 and inner surface 121. In the embodiment shown, sintered powder compact 102 is disposed within and attached to inner surface 121. Outer surface 119 is disposed within and attached to wall 120 of the film-cooling hole.

As an alternate to a sintered powder compact, inserts 100 may also include a metal foam, where the metal foam is also configured to have a porous structure including an open cell foam network of interconnected, interstitial pores or spaces between the matrix metal that extends from proximal end 112 to distal end 114 of body 110, wherein the interconnected, interstitial pores and open cell foam network form a plurality of passageways 116 through which the film-cooling fluid may flow. Inserts 100 that include a metal foam may be disposed in the film-cooling holes by any suitable method, including forming inserts 100 in a separate metal foam, forming operation, followed by insertion into the film-cooling holes and attachment by brazing or the other attachment methods described herein. Furthermore, body 110 that includes a metal foam may also be disposed within a suitable casing 118, such as a tubular casing as shown in FIG. 7. Body 110 that includes metal foam disposed within casing 118 may be disposed within a film-cooling hole (30, 32, 34 or 36) and attached to the wall 120 thereof by brazing, or another of the attachment methods described herein.

Referring to FIGS. 1 and 8-15, in addition to the use of sintered powder compacts or metal foams as described above, inserts 100 may be formed from any material that is suitable for use at the application temperatures of turbine airfoil 12 in the regions where the use of inserts 100 have been described herein. These materials include various pure metal and metal alloy, as described herein. In conjunction with the schematic illustrations of FIGS. 8-15, these are sectioned as metals, but as indicated above, any suitable material may be used for insert 100.

Figure 8:
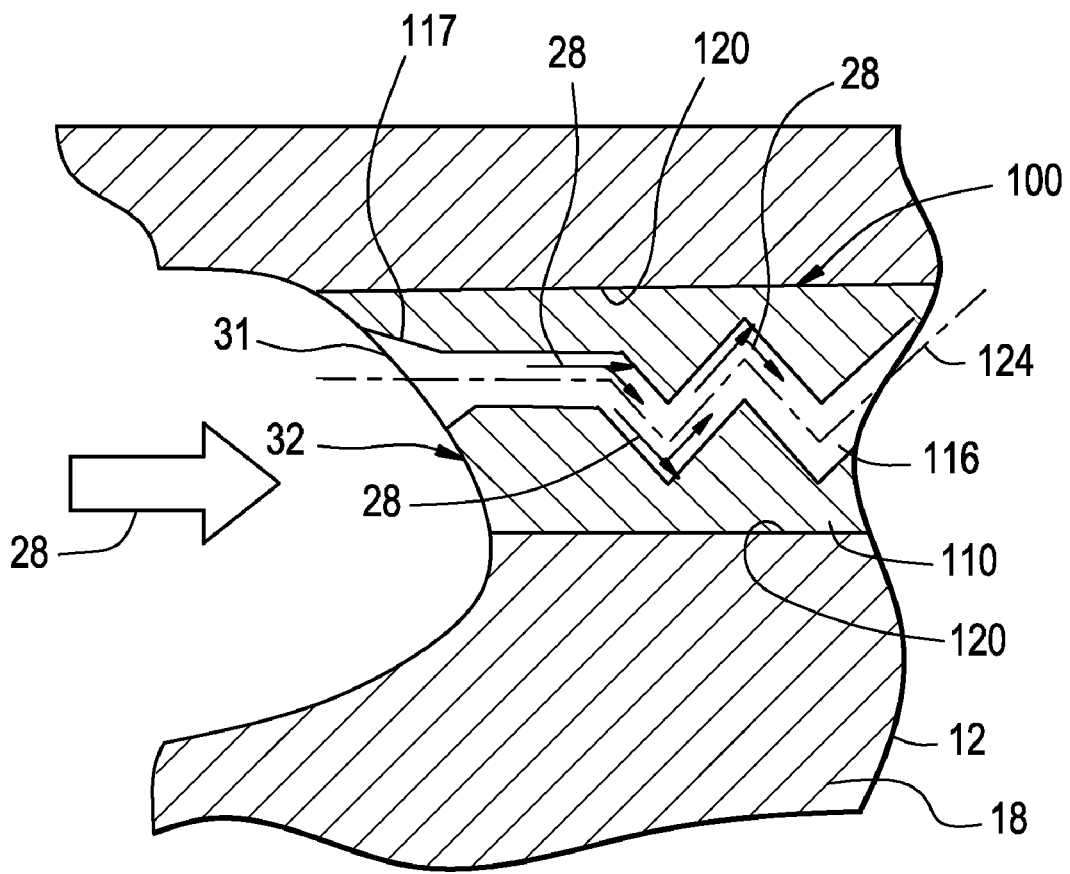
FIG. 8 is a cross-sectional view of section 8-8 of FIG. 1 illustrating a third exemplary embodiment of a film-cooling insert as described herein.

Referring to FIG. 8, an insert 100 for a trailing edge film-cooling hole 32 may have a passageway 116 that includes a tortuous path passageway 116, such as the step or zigzag pattern illustrated. Such a pattern causes a portion of the cooling fluid 28 flowing through passageway 116 at the inflections or corners in the passageway 116 to be forced into the sidewall, thereby producing localized turbulence along the length of passageway 116 and enhancing heat transfer associated with the passage of cooling fluid 28 through passageway 116 having this configuration. Furthermore, the surface area associated with the tortuous path described is greater than the surface area of the sidewall in a passageway 116 of the same diameter, which extends straight through insert 100. The passageway 116 of FIG. 8 has a passageway access 124 having a stepped configuration as shown in FIG. 8. Alternately, similar benefits can be realized with a passageway 116 having a curved profile rather than the sharp steps shown in FIG. 8. For example, where the sharp steps of FIG. 8 have a radius of curvature associated therewith.

Figure 9:
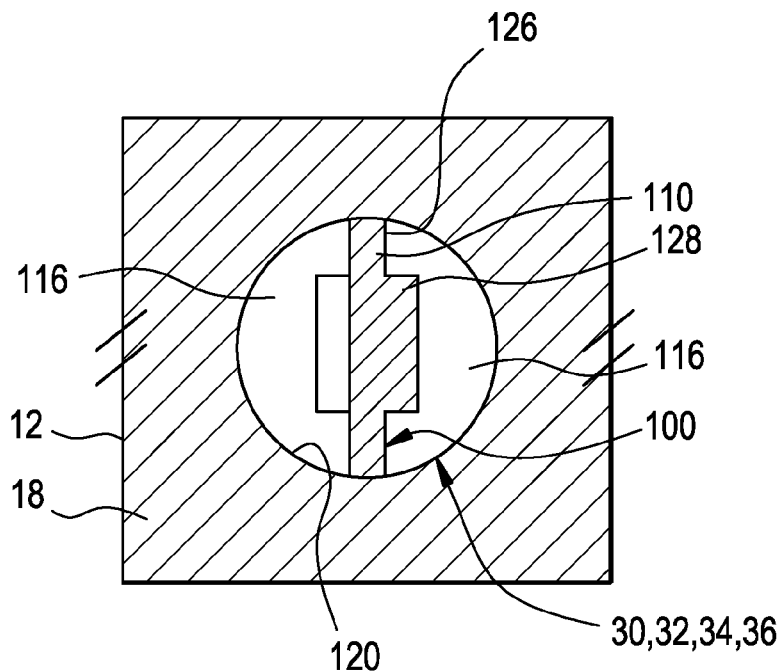
FIG. 9 is a cross-sectional view of a fourth exemplary embodiment of a film-cooling insert as described herein.

Referring to FIG. 9, insert 100 may also include a longitudinally extending rib 126. Rib 126 may extend along the entire length of the film-cooling hole, or only partially along the length thereof, as described herein. Rib 126 may be made from any suitable material, including various pure metals and metal alloys, as described herein. Rib 126 divides the film-cooling hole into two passageways 116. Rib 126 may have the flat plate-like configuration as shown, or alternately may have a series of twists therein, such as helical twists, in order to promote redirection of the cooling fluid 28 as it flows within passageways 116. Further, rib 126 may include one or more lateral protrusions 128 that extend into passageways 116, and which function as turbulators. The lateral protrusions 128 may have any suitable shape and be provided in any suitable number. In an exemplary embodiment, they may be formed by piercing the rib along its length followed by bending of the pierced portion outwardly lateral to the longitudinal axis of the rib, and similar to that shown with respect to lateral protrusions illustrated within FIG. 13. Where lateral protrusions are formed by piercing, the piercing and bending operation also forms openings through the rib between passageways 116, further enhancing turbulence and mixing of the cooling fluid as it passes through passageways 116. Alternately, lateral protrusions may be formed to simply extend from a continuous metal rib (not shown), and may be made, for example, by casting, drawing or similar metal forming processes.

Figure 10:
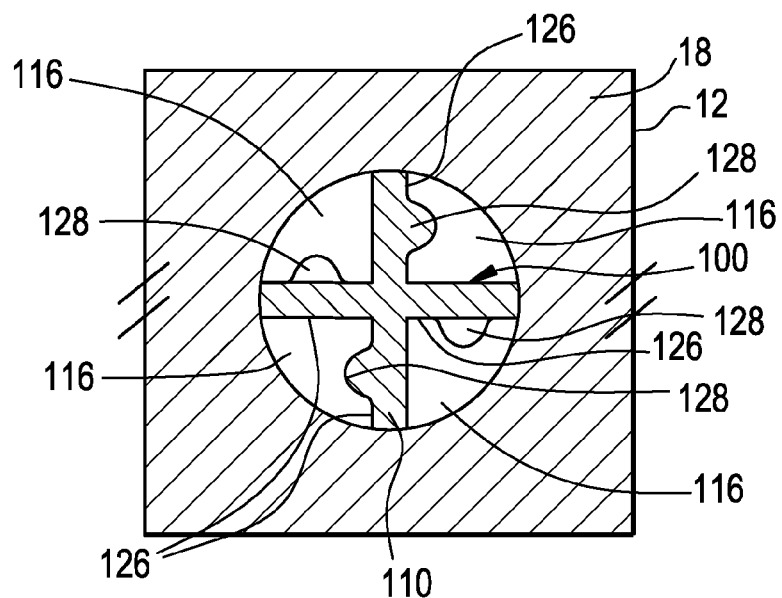
FIG. 10 is a cross-sectional view of a fifth exemplary embodiment of a film-cooling insert as described herein.

Referring to FIG. 10, insert 100 may include a body 110 comprising a plurality of ribs 126. These ribs 126 may be used to define multiple passageways 116 within the film-cooling hole. Ribs may be disposed in the film-cooling hole in the manner described above with respect to a single rib, and may be made from the same materials as described with respect to the single rib 126, or as otherwise described herein. Similarly, ribs 126 may also include one or more lateral protrusions 128 which act as turbulators promoting the turbulent flow of cooling fluid within passageways 116, and enhancing the heat transfer coefficient associated with the film-cooling hole in which it is located in the manner described herein. Lateral projections 128 may be formed in the same manner as described herein with respect to the single rib shown in FIG. 9.

Referring to FIGS. 11 and 12, insert 100 may include a plurality of through-holes formed through body 110, where the through-holes extend from the proximal end 112 to the distal end 114 thereof and form a plurality of passageways 116. In this exemplary embodiment of insert 100, the number of through-holes and their diameter, shape, length and other characteristics may be selected to achieve the desired increase in the heat transfer coefficient associated with the body 110 in the film-cooling hole in which it is disposed, as well as to increase the surface area over which this heat transfer may occur. Referring to FIG. 12, the through-holes forming passageway 116 (or passageways) may have the shape of a longitudinally extending slot (or slots). Additionally, depending on the shape of the through-holes desired, it may be desirable from the standpoint of the structural integrity of the body 110 to incorporate a casing 118, as shown in FIG. 12.

Referring to FIG. 13, insert 100 and body 110 may include a casing 118 as described herein. Casing 118 may include a metal or metal alloy, as described herein. In the embodiment of FIG. 13 passageway 116 is formed by the inner diameter of casing 118. One or more lateral protrusions 128 may be formed by piercing casing 118 and bending pierced portions inwardly into passageway 116. Lateral protrusions 128 function as turbulators promoting turbulence in the cooling fluid flowing through passageway 116. Lateral protrusions 128 may be formed in any pattern or distribution of locations around the circumference and along the length of casing 118. The number and pattern of lateral protrusions may be selected to provide the desired heat transfer coefficient, pressure drop and other design objectives, as described herein, with respect to the film-cooling hole. The lateral protrusions 128 may also be formed so as to extend outwardly from casing 118 (not shown), and passageway 116 may also be formed along the outer diameter and outer surface 119 of casing 118. For example, in an embodiment where lateral protrusions 128 extend outwardly from casing 118, the protrusions may be designed so as to be used for attachment of insert 100 and body 110 within the film-cooling hole. The lateral protrusions 128 may be attached to the sidewall 120 of the film-cooling hole. Still further, lateral protrusions 128 may be formed to project from both the outer surface 119 and inner surface 121 of casing 118, such that passageways 116 are formed both along the outer surface 119 and inner surface 121 of casing 118 (not shown).

Figure 14:
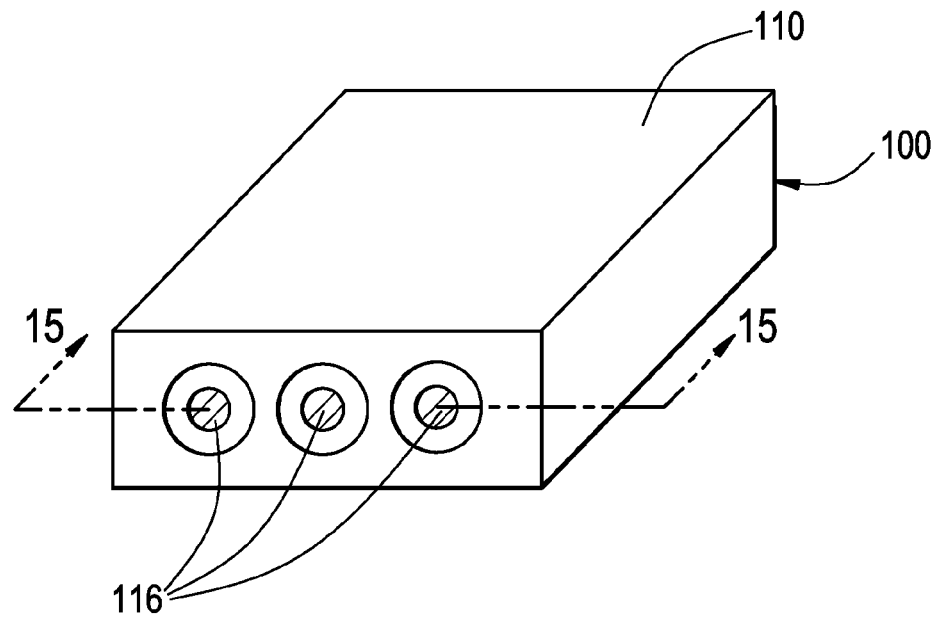
FIG. 14 is a perspective view of a ninth exemplary embodiment of a film-cooling insert as described herein.
Figure 15:
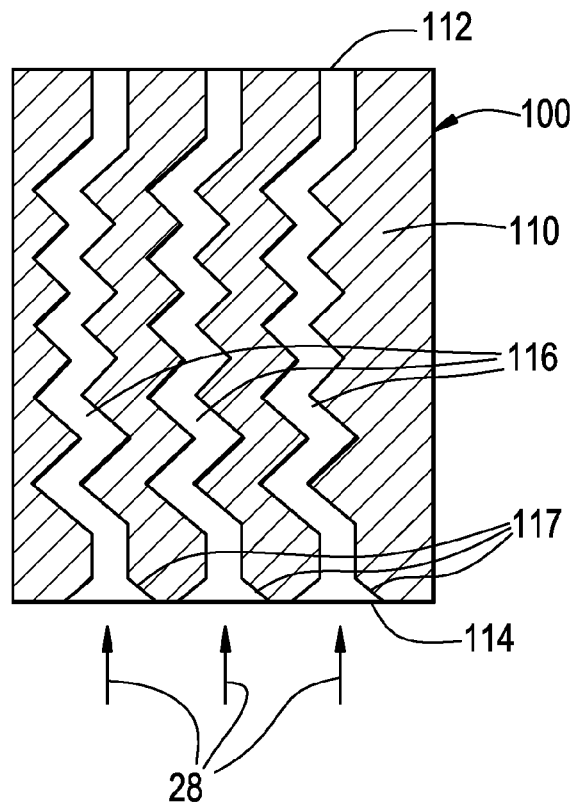
FIG. 15 is a cross-sectional view of section 15-15 of FIG. 14.

Referring to FIGS. 14 and 15, insert 100 and body 110 may have any suitable shape or size, and may be selected so as to require non-conventional film-cooling hole configurations. For example, the rectangular profile of insert 100 would require a corresponding rectangular film-cooling hole, which may be referred to as a film-cooling slot. Such an arrangement could be utilized, for example, along the trailing edge of airfoil 12. Body 110 may be made from any of the materials described herein including various pure metals or metal alloys, as described herein. Further, body 110 may be disposed within the film-cooling hole or slot in the manner described herein with respect to other embodiments of body 110. Body 110 includes a plurality of passageways 116 having a tortuous path from the proximal end 112 to the distal end 114, but otherwise is analogous to the exemplary embodiment of FIG. 8. Similarly, the passageways 116 may have a stepped or curved profile as described with respect to the embodiment of FIG. 8. The passageways 116 may also include a tapered lead-in 117 to promote the flow of cooling fluid 28 into passageway 116. A tapered lead-in may be used in any of the exemplary embodiments of insert 100 illustrated herein, including the embodiment of FIG. 8. The lead-in may be tapered or have any other shape suitable to promote the flow of cooling fluid 28 into passageway 116.

While some of the embodiments of insert 100 described herein have been described as being capable of being formed in place within a film cooling hole, any of the embodiments described herein may be manufactured as discreet components and inserted into and attached to a film cooling hole by a suitable attachment means, including various brazes, various forms of metallurgical bonding, adhesives, cements and the like. As indicated herein, insert 100 may be selected such that it has a melting temperature which is less than the melting temperature of the surrounding sidewall of the airfoil, as well as less than a melting or working temperature of the attachment means, such as a braze, various forms of metallurgical bonding or adhesive. In such configurations, in the event of blockage of film cooling hole, insert 100 is the lowest melting component such that it may be cleared by pressure of the cooling fluid 28 and ejected from the film cooling hole, to ensure that film cooling is restored and will avoid over temperature conditions within the airfoil. Alternately, insert 100 may be selected with a melting temperature that is higher than that of the attachment means, including those described above. In this configuration, in the event that insert 100 or the film cooling hole becomes plugged, the attachment means, such as a braze alloy, will melt first. In this configuration, upon melting of the braze alloy, insert 100 will be ejected by pressure of cooling fluid 28, thereby restoring film cooling within the film cooling hole of interest. Likewise, in the case of adhesives, cements or other attachment means, the attachment means can be selected to release the insert 100 in the manner described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine airfoil, comprising:
    an airfoil sidewall having a film-cooling hole that extends between an airfoil cooling circuit and an airfoil surface; and
    an insert disposed in the film-cooling hole having a body, the body having a proximal end configured for disposition proximate the airfoil surface and a distal end, the body also configured to define a passageway that extends between the distal end and proximal end upon disposition in the film-cooling hole.

2. The turbine airfoil of claim 1, wherein the airfoil comprises a turbine blade or vane comprising a pressure sidewall and an opposing suction sidewall joined together at chordally opposite leading and trailing edges and extending longitudinally in span from a first end to a second end, the cooling circuit is disposed within the pressure sidewall or suction sidewall, and the film-cooling hole extends through one of pressure sidewall, suction sidewall, trailing edge or leading edge.

3. The turbine airfoil of claim 1, wherein the insert comprises a plurality of passageways.

4. The turbine airfoil of claim 3, wherein the insert comprises a sintered powder compact having a porous structure comprising a network of interconnected particles and a corresponding network of interconnected interstitial spaces, the interconnected interstitial spaces comprising the plurality of passageways.

5. The turbine airfoil of claim 1, wherein the passageway has a central axis and the axis is non-linear.

6. The turbine airfoil of claim 5, wherein the passageway is one of a stepped or an arcuate passageway.

7. The turbine airfoil of claim 1, wherein the insert has a longitudinal axis and comprises a laterally extending protrusion exposed to the passageway.

8. The turbine airfoil of claim 3, wherein the insert comprises a longitudinally extending rib, and wherein the passageway is defined by the rib.

9. The turbine airfoil of claim 1, wherein the body comprises a generally tubular structure having an inner and an outer surface.

10. The turbine airfoil of claim 9, wherein the passageways are defined along an inner or an outer surface of the generally tubular structure.

11. The turbine airfoil of claim 9, wherein the passageways are defined by a protruding structure that protrudes from the inner surface or the outer surface of the generally tubular structure.

12. An insert for a film-cooling hole of a turbine airfoil, comprising a body that is configured for disposition in the film-cooling hole, the body having a proximal end configured for disposition proximate an airfoil surface and a distal end, the body also configured to define a passageway that extends between the distal end and proximal end upon disposition in the film-cooling hole.

13. The insert of claim 12, wherein the body comprises a plurality of passageways.

14. The insert of claim 13, wherein the body comprises a sintered powder compact having a porous structure comprising a network of interconnected particles and a corresponding network of interconnected interstitial spaces, the interconnected interstitial spaces comprising the plurality of passageways.

15. The insert of claim 12, wherein the passageway has a central axis and the axis is non-linear.

16. The insert of claim 15, wherein the passageway is one of a stepped or an arcuate passageway.

17. The insert of claim 12, wherein the body comprises a longitudinally extending rib, and wherein the passageway is defined by the rib.

18. The insert of claim 12, wherein the body comprises a generally tubular structure having an inner and an outer surface.

19. The insert of claim 12, wherein the insert has a first melting point and the sidewall has a second melting point, and wherein the first melting point is less than the second melting point.

20. The insert of claim 13, wherein the insert comprises a metal foam having a porous structure comprising an open cell foam network of interconnected, interstitial pores within a matrix metal, the interconnected, interstitial pores and open cell network comprising the plurality of passageways.

* * * * *